US 6,732,761 B2

(12) United States Patent
Bento (10) Patent No.: US 6,732,761 B2
(45) Date of Patent: May 11, 2004

(54) SOLENOID VALVE FOR REDUCED ENERGY CONSUMPTION

(75) Inventor: Jose C. Bento, Sao Paulo (BR)

(73) Assignee: Ross Operating Valve Company, Troy, MI (US)

( * ) Notice: Subject to any disclaimer, the term of this patent is extended or adjusted under 35 U.S.C. 154(b) by 50 days.

(21) Appl. No.: 10/209,655

(22) Filed: Jul. 31, 2002

(65) Prior Publication Data

US 2003/0089407 A1 May 15, 2003

Related U.S. Application Data

(60) Provisional application No. 60/309,843, filed on Aug. 3, 2001.

(51) Int. Cl.[7] ............................................. F15B 13/043
(52) U.S. Cl. .................................. 137/625.64; 91/433
(58) Field of Search ................... 91/426, 433; 137/270, 137/625.64

(56) References Cited

U.S. PATENT DOCUMENTS

| 3,903,787 A | | 9/1975 | Kroth et al. | |
| 4,041,983 A | * | 8/1977 | Bianchetta | ................... 91/433 |
| 4,067,357 A | | 1/1978 | Ruchser | |

FOREIGN PATENT DOCUMENTS

| CH | 364152 | | 8/1962 |
| GB | 2255840 | | 11/1992 |
| JP | 1-283408 A | * | 11/1989 |

OTHER PUBLICATIONS

Abstract of Japanese Publication 01283408 Published Nov. 15, 1989.

* cited by examiner

Primary Examiner—Gerald A. Michalsky
(74) Attorney, Agent, or Firm—Mark L. Molloy; MacMillan, Sobanski & Todd, LLC (57) ABSTRACT

A control valve system including a housing having an inlet, a first output, and a second output. The control valve system further includes a slidable valve positionable in a first position, where fluid communication is established between the inlet and the first output; a second position, where fluid communication is established between the inlet and the second output; and a third position, where fluid communication is prevented between the inlet and the first or second output. A solenoid valve assembly is coupled in fluid communication with the inlet and is positionable in an actuated position, where fluid communication is established with the inlet to move the valve from the first position to the second position, and a deactuated position. A feedback passage extends between the first output and the valve so as to position the valve in the third position in response to fluid pressure within the first output.

11 Claims, 6 Drawing Sheets

SOLENOID VALVE FOR REDUCED ENERGY CONSUMPTION

CROSS-REFERENCE TO RELATED APPLICATIONS

This application claims the benefit of U.S. Provisional Application No. 60/309,843, filed Aug. 3, 2001, the disclosure of which is incorporated by reference.

FIELD OF THE INVENTION

The present invention generally relates to control valves and, more particularly, relates to a control valve capable of reducing the energy consumption thereof.

BACKGROUND OF THE INVENTION

As is well known in the art, control valves have frequently been used to control and supply a working fluid, such as air, to a working device. Typically, these control valves employ a moveable valve spool disposed in a valve housing. The valve housing includes a plurality of fluid passages that are selectively interconnected in response to movement of the valve spool so as to control the flow of the fluid and, thus, the output of the control valve.

Conventional control valves often employ a solenoid valve mounted thereto for actuating the valve spool. The solenoid valve is controlled via an electrical input signal between a first position, where the solenoid valve is de-energized so as to close a fluid passage between an input pilot pressure and an output controlling pressure, and a second position, where the solenoid is energized via the electrical input so as to open a passageway between the input pilot pressure and the output controlling pressure.

It should be readily appreciated to one skilled in the art that in order to apply a constant controlling pressure, the electrical control signal must continue to energize the solenoid valve. That is, in order for a conventional control valve to maintain the spool in a predetermined position, it is necessary to maintain a constant control pressure upon one side of the spool. Therefore, in order to maintain this constant control pressure on the spool, it is necessary to maintain the solenoid valve in an opened and, thus, energized state. Moreover, it is necessary to employ full line fluid pressure to actuate the spool into the predetermined positions. Therefore, it should be understood that if it is preferred that the control valve be in this predetermined position for fluid output, electrical energy consumption to drive compressors to supply full line pressure will increase.

Accordingly, there exists a need in the relevant art to provide a control valve capable of producing an output of working fluid to be used with a conventional working device that is capable of minimizing the energy consumed during actuation. Furthermore, there exists a need in the relevant art to provide a control valve that maintains the position of a control element at a pressure less than full line pressure. Still further, there exists a need in the relevant art to overcome the disadvantages of the prior art.

SUMMARY OF THE INVENTION

A control valve system having an advantageous construction is provided. The control valve system includes a slidable valve positionable in a first position, where fluid communication is established between the inlet and the first output; a second position, where fluid communication is established between the inlet and the second output; and a third position, where fluid communication is prevented between the inlet and the first or second output. A solenoid valve assembly is coupled in fluid communication with the inlet and is positionable in an actuated position, where fluid communication is established with the inlet to move the valve from the first position to the second position, and a deactuated position. A feedback passage extends between the first output and the valve so as to position the valve in the third position in response to fluid pressure within the first output.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. For example, the principles of the present invention are equally applicable to a wide variety of valve systems, such as spool valves, poppet valves (i.e. resilient, metal, ceramic, and the like), trapping presses, and feedback controls.

Referring now to FIGS. 1–4 in which like reference numerals designate like or corresponding parts throughout the several views, there is illustrated a control valve system, which is designated generally by the reference numeral 10. Control valve system 10 is shown as a fluid control valve in FIGS. 1–3 and as a fluid circuit in FIG. 4.

Figure 1:
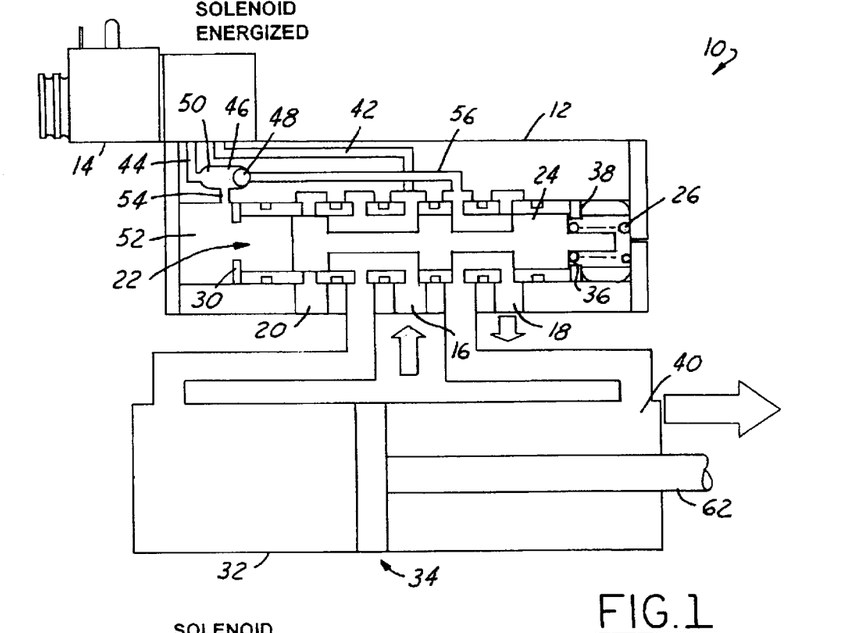
FIG. 1 is a cross-sectional view of a control valve system according to a first embodiment of the present invention illustrated in a normal operation mode where the solenoid valve assembly is energized.
Figure 2:
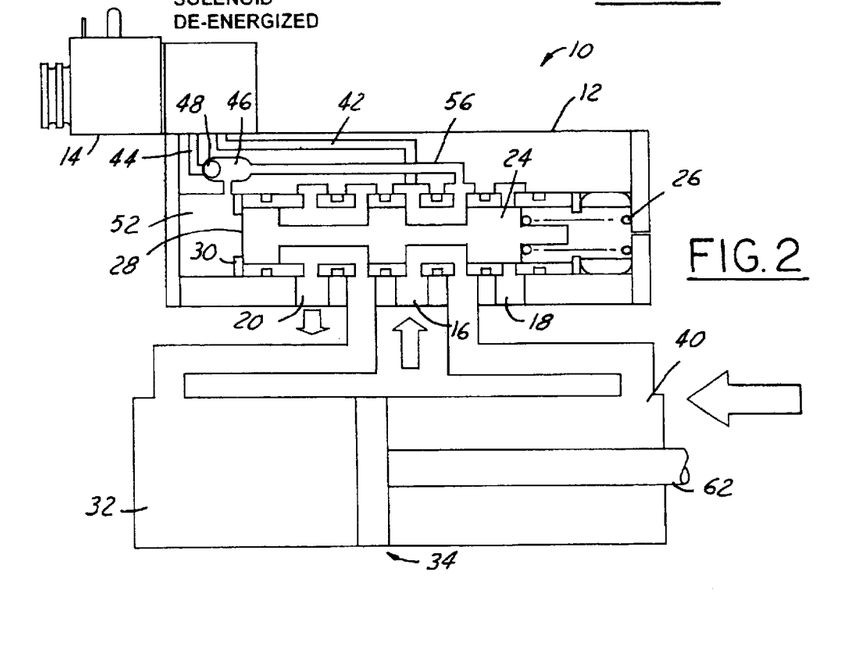
FIG. 2 is a cross-sectional view illustrating the control valve system of FIG. 1 wherein the solenoid valve assembly is de-energized.
Figure 3:
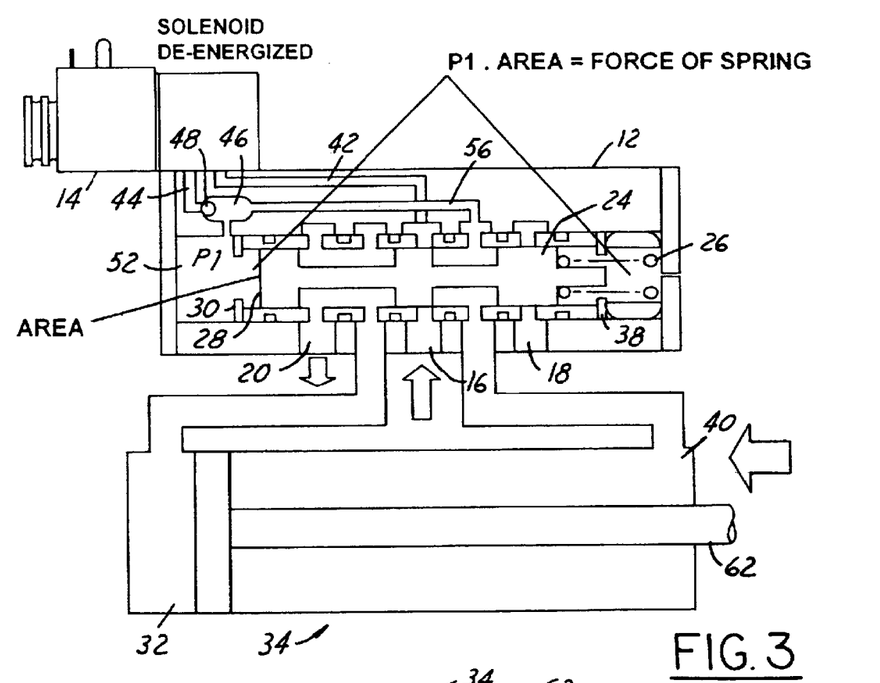
FIG. 3 is a cross-sectional view illustrating the control valve system of FIG. 1 being maintained in a predetermined position while the solenoid valve assembly remains de-energized and the valve spool is in an equilibrium position.

Referring in particular to FIGS. 1–3, control valve system 10 comprises a main valve assembly 12 and a solenoid valve assembly 14. Main valve assembly 12 is positioned adjacent to and operably coupled to solenoid valve assembly 14. Main valve assembly 12 includes a fluid inlet passage 16, a first exhaust passage 18, a second exhaust passage 20, and a valve bore 22. Disposed within valve bore 22 is a valve member or spool 24. Spool 24 is normally biased via a spring 26 into a seated position where a face portion 28 of spool 24 contacts a first stop 30 disposed in valve bore 22 to exhaust fluid from a backside chamber 32 of a piston member assembly 34 out second exhaust passage 20. As will be described below, spool 24 is further positionable in an unseated position where face portion 28 of spool 24 is spaced apart from first stop 30 of valve bore 22, yet a shoulder portion 36 disposed on an opposing side of spool 24 contacts a second stop 38 disposed in valve bore 22 to exhaust fluid from a front side chamber 40 of piston member assembly 34 through first exhaust passage 18.

It should be appreciated that spring 26 may be eliminated. In this case, spool 24 would be actuated in response to differential fluid pressure exerted upon opposing faces of spool 24. It is also anticipated that these faces could include differently sized surfaces areas (i.e. different area ratios), which would enable control valve system 10 to be easily modified to produce a wide range of different output pressures.

Control valve system 10 further includes a plurality of fluid passages interconnecting fluid inlet passage 16, first exhaust passage 18, and second exhaust passage 20. A fluid passage 42 extends between fluid inlet passage 16 and an inlet to solenoid valve assembly 14. Fluid passage 42 serves as a pilot passage to supply a pilot pressure to solenoid valve assembly 14. A fluid passage 44 extends between an outlet of solenoid valve assembly 14 and a shuttle valve 46.

Shuttle valve 46 generally includes a shuttle ball 48 moveably disposed in a shuttle chamber 50. As will be described below, shuttle valve 46 moves in response to fluid pressure to fluidly block opposing ends of shuttle valve 46 against fluid flow. Shuttle valve 46 is fluidly coupled to a valve chamber 52 via a fluid passage 54. Valve chamber 52 is adjacent face portion 28 of spool 24 and disposed within valve bore 22 such that fluid pressure within valve chamber 52 acts upon face portion 28 to move spool 24 against the biasing force of spring 26.

Figure 12:
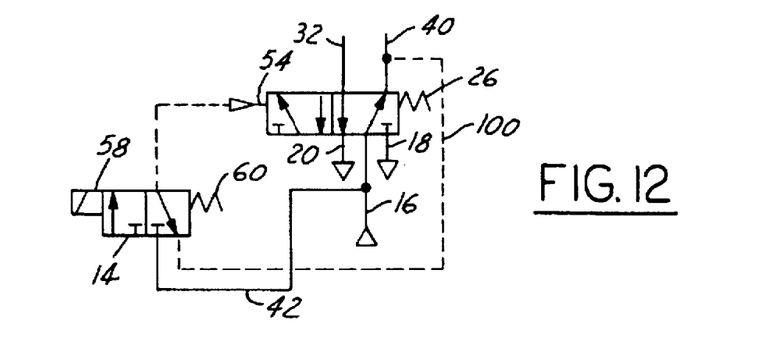
FIG. 12 is a circuit diagram of a control valve system according to a third embodiment of the present invention illustrated in an initial position where the solenoid valve assembly is de-energized and the piston is stationary.
Figure 13:
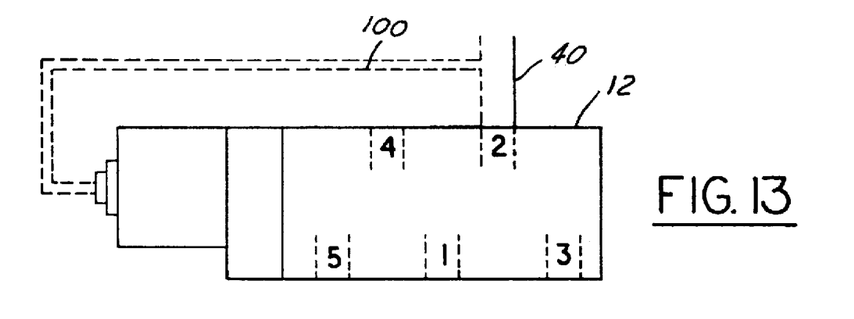
FIG. 13 is a schematic diagram illustrating the feedback passage being disposed externally from the housing.
Figure 14:
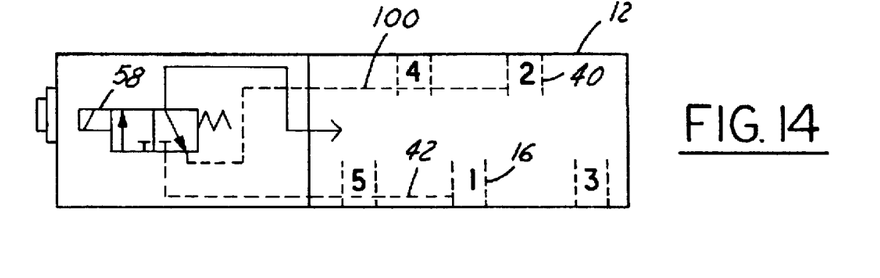
FIG. 14 is a schematic diagram illustrating the feedback passage being disposed internally in the housing.

However, as seen in FIGS. 12–14, shuttle ball 48 may be eliminated to provide a more simplified design. Specifically, a fluid passage 100 extends between front side chamber 40 and solenoid 58. Fluid passage 100 permits the flow or exhaust of pilot fluid from valve chamber 52 to front side chamber 40 when solenoid 58 is in the position shown in FIG. 12. However, it should be appreciated that fluid passage 100 may extend either externally (see FIG. 13) or internally (FIG. 14) of main valve assembly 12.

Control valve system 10 further includes a feedback passage 56 extending between shuttle valve 46 and first exhaust passage 18. Accordingly, shuttle ball 48 of shuttle valve 46 is moveable within shuttle chamber 50 into a first position, where shuttle ball 48 prevents fluid flow through feedback passage 56, and a second position, where shuttle ball 48 prevents back flow of fluid through fluid passage 44.

OPERATION

Figure 4:
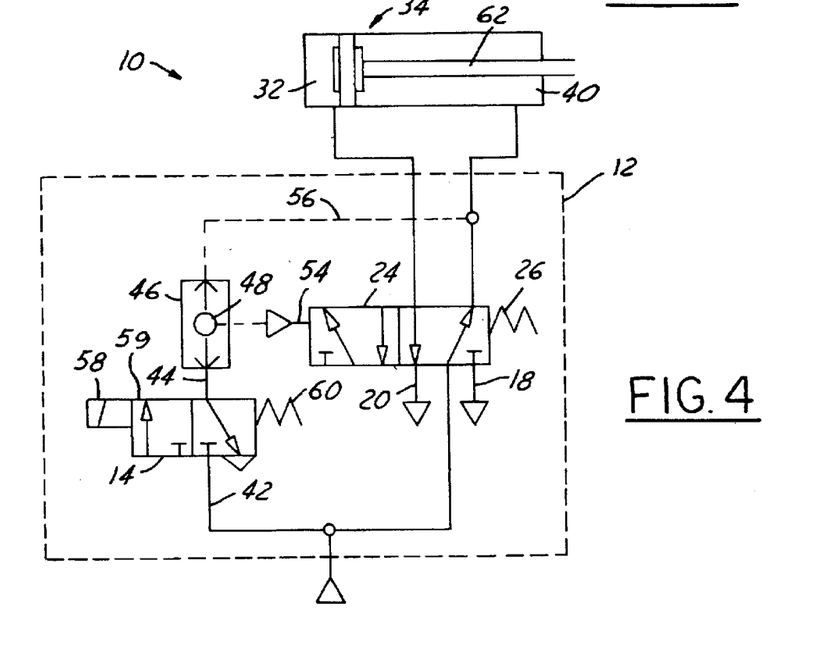
FIG. 4 is a circuit diagram illustrating the control valve system according to the first embodiment of the present invention.

FIG. 1 illustrates control valve system 10 in a normal operation mode in which pressurized fluid from fluid inlet passage 16 is directed into backside chamber 32 of piston member assembly 34 to drive a piston 62 outward (to the right in the figures). Specifically, pressurized fluid from fluid inlet passage 16 is provided in fluid passage 42. As seen in FIG. 4, solenoid valve assembly 14 is energized such that fluid communication is established between fluid passage 42 and fluid passage 44. That is, a solenoid 58 of solenoid valve assembly 14 is energized such that a solenoid spool 59 is moved to the right in FIG. 4 against the biasing force of a solenoid spring 60. Pressurized fluid is then introduced from fluid passage 44 into shuttle valve 46, thereby moving shuttle ball 48 against feedback passage 56. Pressurized fluid within shuttle valve 46 is then directed into valve chamber 52. The fluid pressure within valve chamber 52 acts upon face portion 28 of spool 24. Once the fluid pressure within valve chamber 52 is greater than the biasing force of spring 26, spool 24 moves to the right until shoulder portion 36 of spool 24 is seated upon second stop 38. This movement of spool 24 enables fluid to flow from fluid inlet passage 16 into backside chamber 32 of piston member assembly 34, thereby extending piston 62 outward (to the right in FIGS. 1–4). Accordingly, when control valve system 10 is in the position illustrated in FIG. 1, fluid inlet passage 16, backside chamber 32 of piston member assembly 34, fluid passage 42, shuttle valve 46, and valve chamber 52 are all at the same fluid pressure, namely equal to the fluid pressure of fluid inlet passage 16.

Referring now to FIG. 2, solenoid valve assembly 14 is de-energized and therefore pilot fluid from fluid passage 42 is prevented from entering shuttle valve 46 and, consequently, valve chamber 52. Therefore, the biasing force of spring 26 acting on shoulder portion 36 of spool 24 biases spool 24 leftward until face portion 28 generally contacts first stop 30. This leftward movement of spool 24 enables fluid communication between fluid inlet passage 16 and front side chamber 40 of piston member assembly 34, thereby retracting piston 62.

As can be appreciated from FIG. 2, feedback passage 56 is in fluid communication with front side chamber 40 of piston member assembly 34 and, therefore, is at the same fluid pressure. The introduction of pressurized fluid from fluid inlet passage 16 into front side chamber 40 and feedback passage 56 forces shuttle ball 48 of shuttle valve 46 leftward, since the fluid pressure of fluid inlet passage 16 is now greater than the fluid pressure within valve chamber 52. This leftward movement of shuttle ball 48 and shuttle valve 46 then permits fluid flow from front side chamber 40 of piston member assembly 34 into valve chamber 52, thereby increasing the fluid pressure within valve chamber 52 once again. During this time, fluid is exhausted from backside chamber 32 of piston member assembly 34 through second exhaust passage 20.

As best seen in FIG. 3, fluid flow from fluid inlet passage 16 into front side chamber 40 of piston member assembly 34 and valve chamber 52 will continue until the pressure within valve chamber 52 is equal to the biasing force of spring 26. When the fluid pressure within valve chamber 52 equals the biasing force of spring 26, spool 24 reaches an intermediate equilibrium position wherein fluid flow from fluid inlet passage 16 into any of the remaining fluid passages is prevented. However, it should be appreciated by one skilled in the art that any fluid leaks or other anomalies which decrease the fluid pressure in front side chamber 40 of piston member assembly 34 will cause a simultaneous decrease in fluid pressure within valve chamber 52. This decrease in fluid pressure in valve chamber 52 enables spring 26 to move spool 24 leftward, thereby again opening fluid communication between fluid inlet passage 16 and front side chamber 40 of piston member assembly 34. As explained above, this fluid communication will continue until the fluid pressure within front side chamber 40, feedback passage 56, and valve chamber 52 is equal to the biasing force of spring 26. Therefore, it should be clear that feedback passage 56 serves to provide a method of automatically maintaining a fluid pressure in front side chamber 40 of piston member assembly 34 simply by choosing an appropriate biasing force in spring 26. The preferred fluid pressure to be maintained is directly proportional to the force of spring 26 and, therefore, spring 26 may be selected to determine the equilibrium fluid pressure.

Moreover, it should be appreciated that the pressure regulation feature of the present invention is accomplished without the need to provide full line pressure, which would otherwise consume an excessive amount of electrical energy. That is, by way of non-limiting example, traditional double action cylinders often operate such that their return to their initial position is only accomplished through the use of full-line pressure. This use of full-line pressure in the return stroke consumes an equivalent amount of compressed air as that consumed during a power stroke. This consumption of compressed air during the return stroke is believed to be unnecessary. According to the principles of the present invention, the low pressure in one outlet is sufficient for a rapid return stroke, which reduces the amount of compressed air that is consumed, thereby reducing the energy consumed by the work element. Additionally, due to the low pressure that is applied, the potential for leaks in the cylinder and/or fittings is also reduced. These advantages are obtained through the operation of the spool as a pressure regulator.

ALTERNATIVE EMBODIMENT

Referring now to FIGS. 5–11, in which like reference numerals designate like or corresponding parts throughout the several views and those views of the first embodiment, there is illustrated a control valve system 10' in accordance with a second embodiment of the present invention. Control valve system 10' is illustrated as a fluid control valve in FIGS. 5–10 and as a schematic fluid circuit in FIG. 11.

Figure 5:
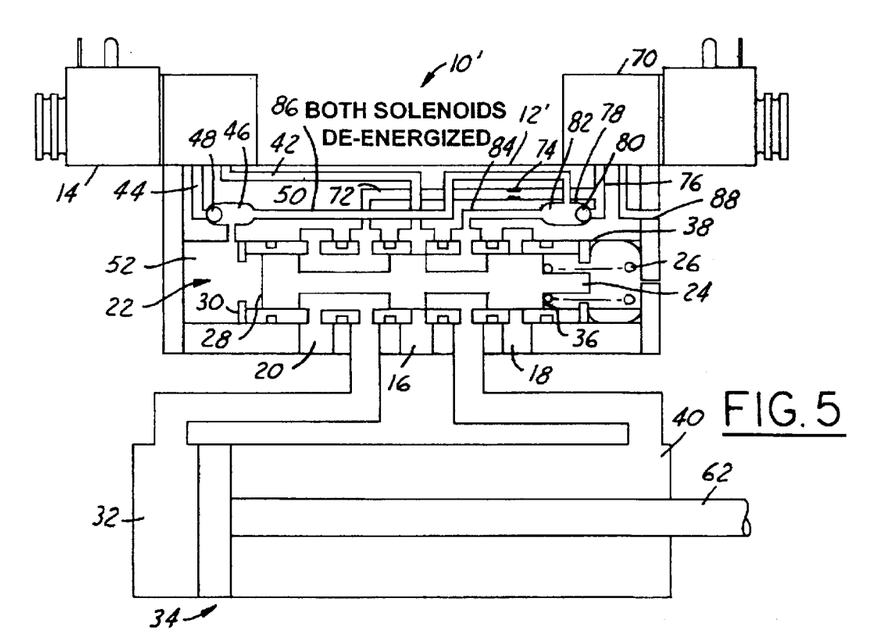
FIG. 5 is a cross-sectional view of a control valve system according to a second embodiment of the present invention illustrated in an initial position where the first and second solenoid valve assemblies are de-energized and the piston is stationary.

Referring now to FIG. 5, control valve system 10' comprises a second solenoid valve assembly 70 that is mounted to a main valve assembly 12'. Main valve assembly 12' is positioned adjacent to and operably coupled to first solenoid valve assembly 14 and second solenoid valve assembly 70. Main valve assembly 12' includes fluid inlet passage 16, first exhaust passage 18, second exhaust passage 20, and valve bore 22. Disposed within valve bore 22 is spool 24. Spool 24 is normally biased via spring 26 into a seated position where face portion 28 of spool 24 contacts first stop 30 disposed in valve bore 22 to exhaust fluid from backside chamber 32 of piston member assembly 34 out second exhaust passage 20. As described above, spool 24 is positionable in an unseated position where face portion 28 of spool 24 is spaced apart from first stop 30 of valve bore 22, yet shoulder portion 36 contacts second stop 38 disposed in valve bore 22 to exhaust fluid from front side chamber 40 of piston member assembly 34 through first exhaust passage 18.

Control valve system 10' further includes a plurality of fluid passages interconnecting fluid inlet passage 16, first exhaust passage 18, and second exhaust passage 20. Fluid passage 42 extends between fluid inlet passage 16 and the inlet to solenoid valve assembly 14. Fluid passage 42 serves as a pilot passage to supply pilot pressure to solenoid valve assembly 14. Fluid passage 44 extends between the outlet of solenoid valve assembly 14 and shuttle valve 46. Shuttle valve 46 generally includes shuttle ball 48 moveably disposed in a shuttle chamber 50. Shuttle valve 46 moves in response to fluid pressure to fluidly block opposing ends of shuttle valve 46 against fluid flow. Shuttle valve 46 is fluidly coupled to valve chamber 52 via fluid passage 54. Valve chamber 52 is adjacent face portion 28 of spool 24 and disposed within valve bore 22 such that fluid pressure within valve chamber 52 acts upon face portion 28 to move spool 24 against the biasing force of spring 26.

Control valve system 10' further includes a first feedback passage 72 extending between backside chamber 32 of piston member assembly 34 and an inlet of second solenoid valve assembly 70. A restrictor 74 is disposed within fluid passage 70 to limit the amount of fluid flow through first feedback passage 72. A fluid passage 76 extends between second solenoid valve assembly 70 and a second shuttle valve 78. Fluid passage 76 is further in fluid communication with first feedback passage 72 downstream of restrictor 74.

Second shuttle valve 78 generally includes a shuttle ball 80 moveably disposed within a shuttle chamber 82. As will be described below, second shuttle valve 78 moves in response to fluid pressure to fluidly block opposing ends of second shuttle valve 78 against fluid flow. Second shuttle valve 78 is fluidly coupled to front side chamber 40 of piston member assembly 34 via a fluid passage 84. Furthermore, a second feedback passage 86 extends between second shuttle valve 78 and first shuttle valve 46. Accordingly, shuttle ball 48 of first shuttle valve 46 is moveable within shuttle chamber 50 into a first position, where shuttle ball 48 prevents fluid flow from first shuttle valve 46 to second shuttle valve 78 and permits fluid flow into valve chamber 52, and a second position, where shuttle ball 48 prevents back flow of fluid through fluid passage 44 and permits fluid flow from second feedback passage 86 to valve chamber 52. Furthermore, shuttle ball 80 of second shuttle valve 78 is moveable within shuttle chamber 82 into a first position, where shuttle ball 80 prevents fluid flow from fluid passage 76 to fluid passage 84, and a second position, where shuttle ball 80 prevents back flow of fluid from second feedback passage 86 to fluid passage 76. It should be noted, however, that shuttle ball 80 of second shuttle valve 78 can not block second feedback passage 86, hence second feedback passage 86 is always in fluid communication with either fluid passage 76 or fluid passage 84.

OPERATION

Figure 6:
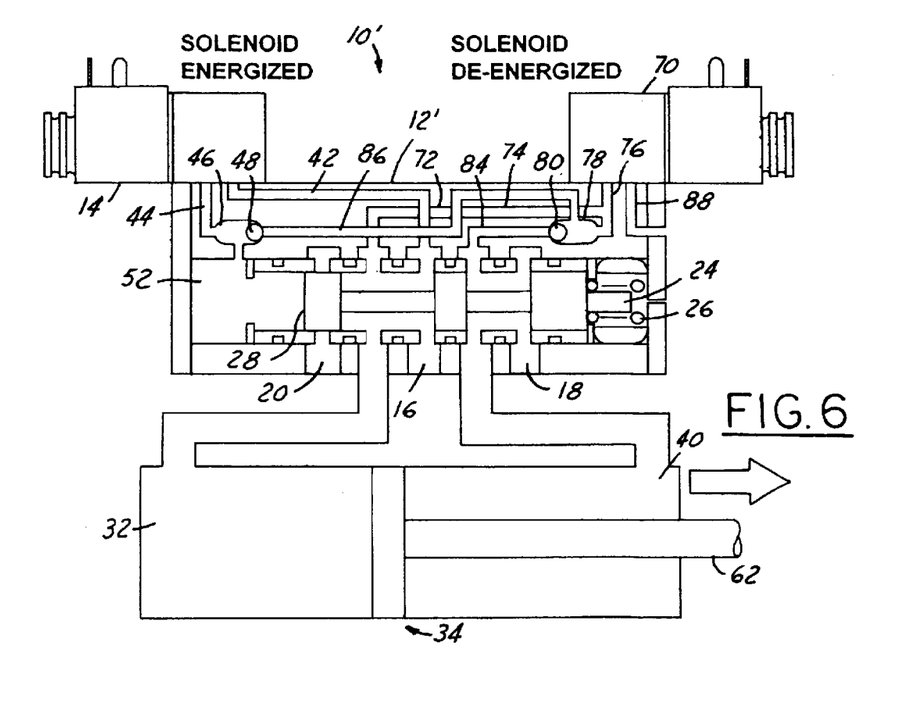
FIG. 6 is a cross-sectional view illustrating the control valve system of FIG. 5 wherein the first solenoid valve assembly is energized and the second solenoid valve assembly is de-energized.

FIG. 5 illustrates control valve system 10' in its initial equilibrium position. As illustrated in FIG. 6, first solenoid valve assembly 14 is then energized FIG. 6 illustrates control valve system 10' in a normal operation mode in which pressurized fluid from fluid inlet passage 16 is directed into backside chamber 32 of piston member assembly 34 to drive piston 62 outward (to the right in the FIGS.). Specifically, pressurized fluid from fluid inlet passage 16 is provided in fluid passage 42. First solenoid valve assembly 14 is energized such that fluid communication is established between fluid passage 42 and fluid passage 44. Pressurized fluid is then introduced from fluid passage 44 into first shuttle valve 46, thereby moving shuttle ball 48 against second feedback passage 86. Pressurized fluid within first shuttle valve 46 is then directed into valve chamber 52. The fluid pressure within valve chamber 52 acts upon face portion 28 of spool 24. Once the fluid pressure within valve chamber 52 is greater than the biasing force of spring 26, spool 24 moves to the right until shoulder portion 36 of spool 24 is seated upon second stop 38. This movement of spool 24 enables fluid to flow from fluid inlet passage 16 into backside chamber 32 of piston member assembly 34, thereby extending piston 62 outward (to the right in FIGS. 5–11). Fluid flow is consequently established between backside chamber 32 and first feedback passage 72, second solenoid valve assembly 70, and second shuttle valve 78. Due to the pressure difference in second shuttle valve 78, shuttle ball 80 will shift to close fluid passage 84 and to open second feedback passage 86. Accordingly, when control valve system 10 is in the position illustrated in FIG. 6, fluid inlet passage 16, backside chamber 32 of piston member assembly 34, fluid passage 42, first shuttle valve 46, and valve chamber 52 are all at the same fluid pressure, namely equal to the fluid pressure of fluid inlet passage 16.

Figure 7:
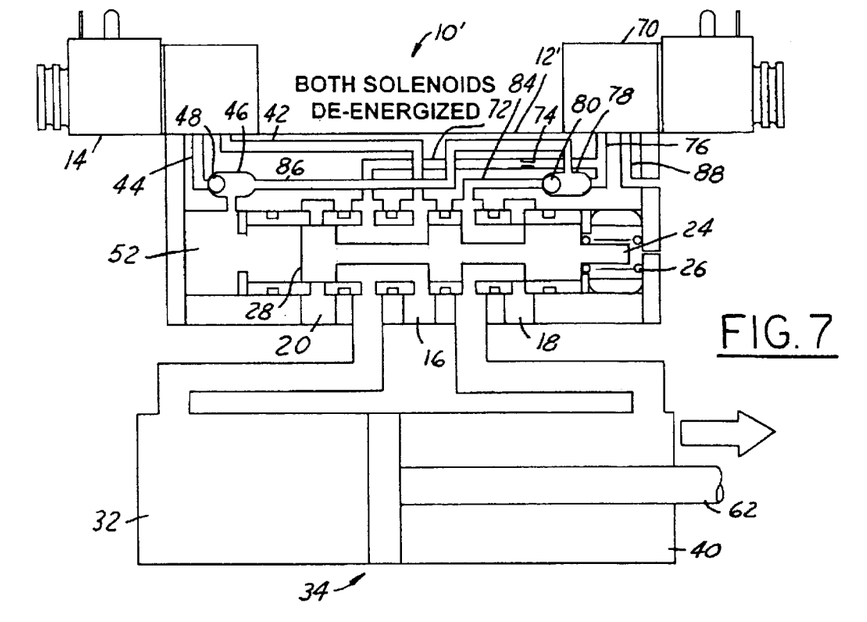
FIG. 7 is a cross-sectional view illustrating the control valve system of FIG. 5 wherein the first and second solenoid valve assemblies are de-energized and the piston continues to extend.
Figure 9:
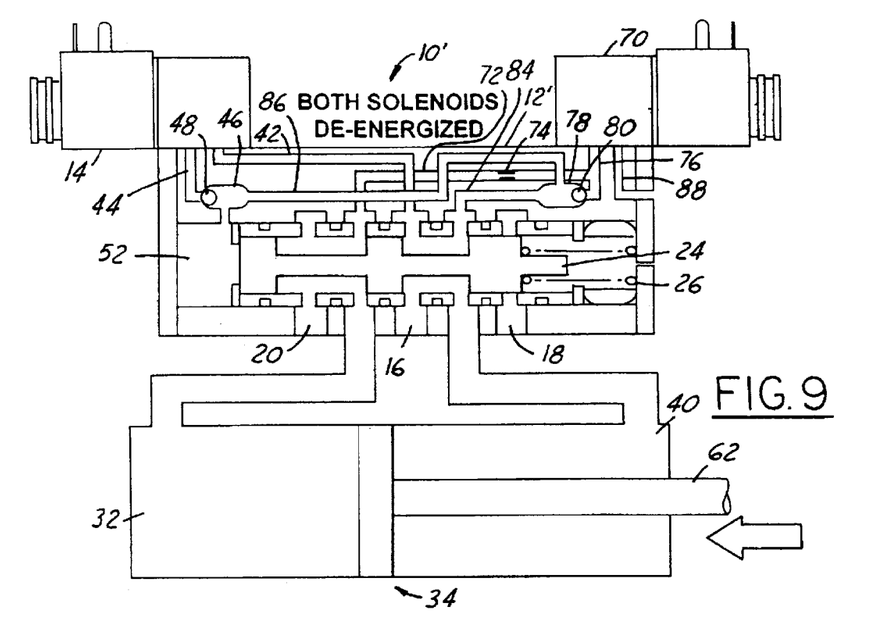
FIG. 9 is a cross-sectional view illustrating the control valve system of FIG. 5 wherein the first and second solenoid valve assemblies are de-energized and the piston continues to retract.

Referring now to FIG. 7, first solenoid valve assembly 14 and second solenoid valve assembly 70 are de-energized and therefore pilot fluid from fluid passage 42 is prevented from entering first shuttle valve 46 and, consequently, valve chamber 52. Therefore, the biasing force of spring 26 acting on shoulder portion 36 of spool 24 begins to move spool 24 leftward until face portion 28 generally contacts first stop 30 (as shown in FIG. 9). This leftward movement of spool 24 enables fluid communication between fluid inlet passage 16 and front side chamber 40 of piston member assembly 34, thereby retracting piston 62.

Figure 8:
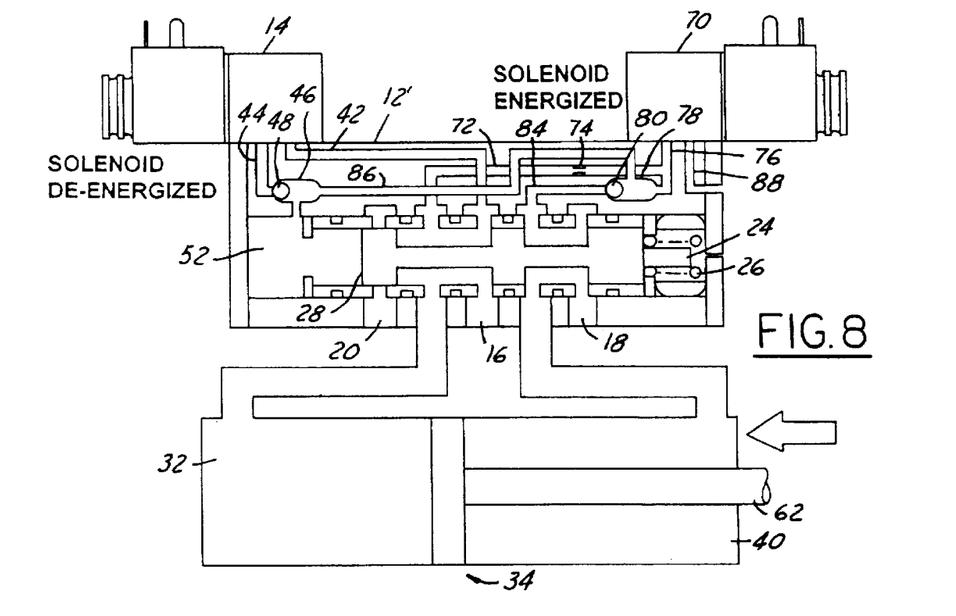
FIG. 8 is a cross-sectional view illustrating the control valve system of FIG. 5 wherein the first solenoid valve assembly is de-energized and the second solenoid valve assembly is energized.

As best seen in FIG. 8, when second solenoid valve assembly 70 is energized such that fluid communication is established between fluid passage 76 and an exhaust passage 88. Consequently, fluid pressure is relieved from valve chamber 52, first shuttle valve 46, second feedback passage 86, second shuttle valve 78, and at least a portion of first feedback passage 72 downstream of restrictor 74. This reduction of fluid pressure in valve chamber 52 causes spool 24 to move to the left under the biasing force of spring 26 as illustrated in FIG. 9. Therefore, fluid flow is established between fluid inlet passage 16 and front side chamber 40 of piston chamber assembly 32 to retract piston 62.

Figure 10:
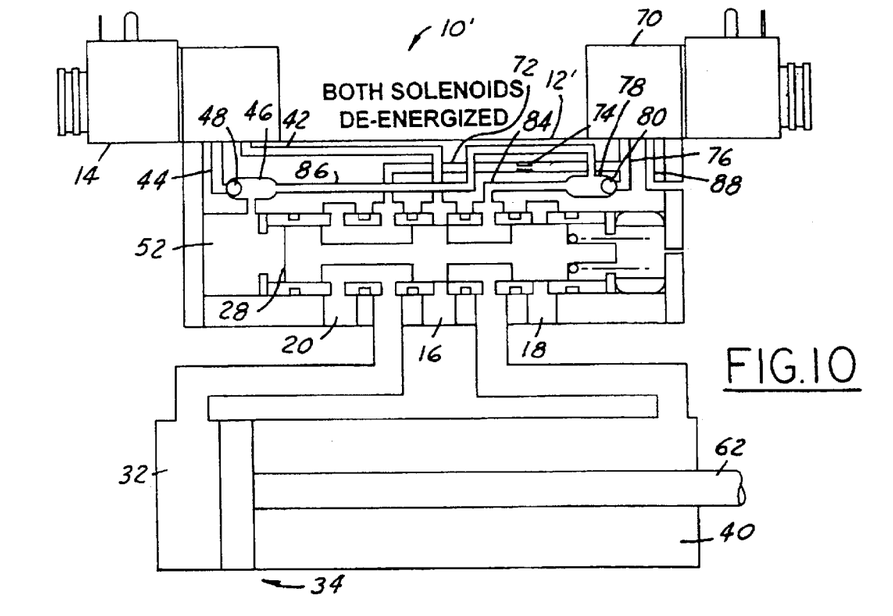
FIG. 10 is a cross-sectional view illustrating the control valve system of FIG. 5 wherein the first and second solenoid valve assemblies are de-energized and the piston is stationary.
Figure 11:
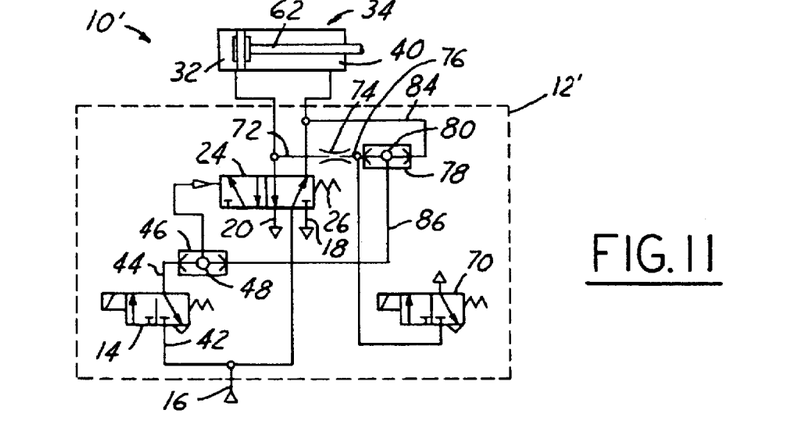
FIG. 11 is a circuit diagram illustrating the control valve system according to the second embodiment of the present invention.

As can be appreciated from FIG. 10, fluid passage 84, second shuttle valve 78, second feedback passage 86, and first shuttle valve 46 establish fluid communication between front side chamber 40 of piston member assembly 34 and valve chamber 52 and, therefore, are at the same fluid pressure in this state. As in the first embodiment, these passages serve to maintain the fluid pressure within front side chamber 40 at a pressure directly proportional to spring 26 and are able to overcome pressure leakage and the like using a pressure less than full line pressure, thereby reducing the amount of energy consumed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control valve system comprising:
   a housing having an inlet, a first output, and a second output;
   a valve positionable in at least a first position where fluid communication is established between said inlet and said first output, a second position where fluid communication is established between said inlet and said second output, and a third position where fluid communication is generally prevented between said inlet and said first output or said second output, said valve being biased into said first position;
   a solenoid valve assembly coupled in fluid communication with said inlet, said solenoid valve assembly being positionable in an actuated position where fluid communication is established with said inlet to move said valve from said first position to said second position and a deactuated position; and
   a feedback passage extending between said first output and said valve so as to position said valve in said third position in response to fluid pressure within said first output, wherein said feedback passage extends from said first output, through said solenoid valve assembly, and into said valve only when said solenoid valve assembly is in said deactuated position.

2. The control valve system according to claim 1 wherein said solenoid valve assembly is biased into said deactuated position.

3. The control valve system according to claim 1 wherein said feedback passage is disposed within said housing.

4. The control valve system according to claim 1 wherein said feedback passage is disposed outside of said housing.

5. A control valve system comprising:
   a housing having an inlet, a first output, a second output, and a valve chamber;
   a spool slidably disposed in said valve chamber, said spool being positionable in a first position where fluid communication is established between said inlet and said first output, a second position where fluid communication is established between said inlet and said second output, and a third position where fluid communication is generally prevented between said inlet and said first output or said second output, said spool being biased into said first position;
   a first solenoid valve assembly coupled in fluid communication with said inlet, said first solenoid valve assembly being positionable in an actuated position where fluid communication is established between said inlet to said spool to move said spool from said first position to said second position and a deactuated position;
   a first shuttle valve disposed in fluid communication with said first output and said second output, said first shuttle valve being positionable in at least a first position where fluid communication is established between said first output and a first shuttle valve outlet and a second position where fluid communication is established between said second output and said first shuttle valve outlet;

and a second shuttle valve disposed in fluid communication with said first shuttle valve outlet, said first solenoid valve assembly, and said valve chamber, said second shuttle valve being positionable in at least a first position where fluid communication is established between said first shuttle valve outlet and said valve chamber and a second position where fluid communication is established between said first solenoid valve assembly and said valve chamber, whereby said first shuttle valve and said second shuttle valve cooperate to selectively provide fluid pressure against said spool to position said spool into said third position.

6. The control valve system according to claim 5, further comprising: a second solenoid valve assembly coupled in fluid communication with said second output, said second solenoid valve assembly being positionable in an actuated position where fluid communication is established between said second output and a vent and a deactuated position preventing fluid communication between said second output and said vent.

7. The control valve system according to claim 6, further comprising: a restrictor disposed between said second output and said second solenoid valve assembly.

8. A control valve system comprising:

a housing having an inlet, a first output, a second output, and a valve chamber;

a spool slidably disposed in said valve chamber, said spool being positionable in a first position where fluid communication is established between said inlet and said first output, a second position where fluid communication is established between said inlet and said second output, and a third position where fluid communication is generally prevented between said inlet and said first output or said second output;

a solenoid valve assembly coupled in fluid communication with said inlet, said solenoid valve assembly being positionable in an actuated position where fluid communication is established between said inlet and said spool to move said spool from said first position to said second position and a deactuated position; and a feedback passage extending between said first output and said valve chamber so as to position said spool in said third position in response to fluid pressure within said first output, wherein said feedback passage extends from said first output, through said solenoid valve assembly, and into said valve chamber only when said solenoid valve assembly is in said deactuated position.

9. The control valve system according to claim 8 wherein said solenoid valve assembly is biased into said deactuated position.

10. The control valve system according to claim 8 wherein said feedback passage is disposed within said housing.

11. The control valve system according to claim 8 wherein said feedback passage is disposed outside of said housing.

* * * * *